US009624870B2

(12) United States Patent
Ress, Jr. et al.

(10) Patent No.: US 9,624,870 B2
(45) Date of Patent: Apr. 18, 2017

(54) ADAPTIVE FAN SYSTEM FOR A VARIABLE CYCLE TURBOFAN ENGINE

(75) Inventors: Robert A. Ress, Jr., Carmel, IN (US); Steve Stratton, Indianapolis, IN (US); Matthew J. Starr, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 932 days.

(21) Appl. No.: 13/637,619

(22) PCT Filed: Mar. 27, 2011

(86) PCT No.: PCT/US2011/030119
§ 371 (c)(1),
(2), (4) Date: Apr. 18, 2013

(87) PCT Pub. No.: WO2011/162845
PCT Pub. Date: Dec. 29, 2011

(65) Prior Publication Data
US 2013/0199156 A1 Aug. 8, 2013

Related U.S. Application Data

(60) Provisional application No. 61/317,978, filed on Mar. 26, 2010.

(51) Int. Cl.
*F02K 3/075* (2006.01)
*F02K 3/077* (2006.01)
(Continued)

(52) U.S. Cl.
CPC .............. *F02K 3/075* (2013.01); *F02C 3/113* (2013.01); *F02C 7/32* (2013.01); *F02C 7/36* (2013.01);
(Continued)

(58) Field of Classification Search
CPC .. F02C 3/113; F02C 3/107; F02C 7/36; F02K 3/02–3/077
See application file for complete search history.

(56) References Cited

U.S. PATENT DOCUMENTS

| 2,723,531 A | 11/1955 | Wosika et al. |
| 4,010,608 A | 3/1977 | Simmons |

(Continued)

FOREIGN PATENT DOCUMENTS

| EP | 1777370 A2 | 4/2007 |
| EP | 2123884 A2 | 11/2009 |
| GB | 2199375 A | 7/1988 |

OTHER PUBLICATIONS

European Patent Office, Extended Search Report issued in Application No. 11798531.7, dated Aug. 28, 2014, 7 pp.
(Continued)

*Primary Examiner* — Phutthiwat Wongwian
*Assistant Examiner* — Rene Ford
(74) *Attorney, Agent, or Firm* — McCracken & Gillen LLC (57) ABSTRACT

An adaptive fan system for a variable cycle turbofan engine having at least one turbine, includes a shaft structured to receive mechanical power from a turbine in the variable cycle turbofan engine and a first fan stage that is coupled directly to the shaft and is driven directly by the shaft. A transmission system is coupled to the shaft and a second fan stage is coupled to the shaft via the transmission system and is driven by the shaft via the transmission system. The transmission system is structured to selectively vary a speed between high and low speeds at which power is supplied from the shaft to the second fan stage relative to at least one of the shaft and the first fan stage, wherein the first fan stage and the second fan stage are configured to rotate in the same
(Continued)

direction and at the same high speed to increase the mechanical power of the turbine.

19 Claims, 3 Drawing Sheets (51) Int. Cl.
- F02C 7/36 (2006.01)
- F02C 3/113 (2006.01)
- F02K 3/06 (2006.01)
- F02C 7/32 (2006.01)
- F16D 47/04 (2006.01)
- F16D 21/06 (2006.01)

(52) U.S. Cl.
CPC .............. *F02K 3/06* (2013.01); *F02K 3/077* (2013.01); *F16D 47/04* (2013.01); *F05D 2260/40* (2013.01); *F05D 2260/4023* (2013.01); *F05D 2260/40311* (2013.01); *F16D 21/06* (2013.01); *Y02T 50/671* (2013.01)

(56) References Cited

U.S. PATENT DOCUMENTS

| | | | |
|---|---|---|---|
| 4,064,692 A | 12/1977 | Johnson et al. | |
| 4,080,785 A | 3/1978 | Koff et al. | |
| 4,175,384 A * | 11/1979 | Wagenknecht | F02K 3/075 60/226.3 |
| 4,817,382 A | 4/1989 | Rudolph et al. | |
| 6,082,511 A | 7/2000 | Shirataki et al. | |
| 6,158,210 A * | 12/2000 | Orlando | F02C 3/067 29/889.2 |
| 6,438,941 B1 * | 8/2002 | Elliott | F01D 17/105 60/226.1 |
| 6,701,717 B2 | 3/2004 | Flatman et al. | |
| 6,763,654 B2 | 7/2004 | Orlando et al. | |
| 6,865,891 B2 | 3/2005 | Walsh et al. | |
| 6,895,741 B2 | 5/2005 | Rago et al. | |
| 6,901,739 B2 | 6/2005 | Christopherson | |
| 7,758,303 B1 * | 7/2010 | Wadia | F01D 5/022 415/77 |
| 2004/0060279 A1 * | 4/2004 | Robert Joseph | F01D 1/24 60/226.1 |
| 2005/0047942 A1 * | 3/2005 | Grffin, III | F02K 3/072 417/423.1 |
| 2006/0059887 A1 * | 3/2006 | Klingels | F02K 3/06 60/204 |
| 2006/0196164 A1 | 9/2006 | Donohue | |
| 2006/0236675 A1 | 10/2006 | Weiler | |
| 2006/0272313 A1 * | 12/2006 | Eick | F02C 3/107 60/39.63 |
| 2007/0051091 A1 | 3/2007 | Rolt | |
| 2007/0084186 A1 * | 4/2007 | Orlando | F02C 3/107 60/204 |
| 2007/0125066 A1 | 6/2007 | Orlando et al. | |
| 2007/0186535 A1 | 8/2007 | Powell et al. | |
| 2008/0120839 A1 * | 5/2008 | Schilling | F02C 3/107 29/888.02 |
| 2009/0000271 A1 * | 1/2009 | Kupratis | F02K 3/077 60/224 |
| 2009/0090096 A1 * | 4/2009 | Sheridan | F02C 7/36 60/226.3 |
| 2009/0145102 A1 | 6/2009 | Roberge et al. | |
| 2009/0293445 A1 | 12/2009 | Ress, Jr. | |
| 2009/0320491 A1 * | 12/2009 | Copeland | F02C 7/277 60/772 |
| 2010/0218478 A1 * | 9/2010 | Merry | F02C 3/067 60/205 |
| 2010/0219779 A1 * | 9/2010 | Bradbrook | F02C 3/113 318/153 |
| 2011/0130246 A1 * | 6/2011 | McCune | F01D 25/164 477/115 |
| 2011/0148237 A1 * | 6/2011 | Toot | H02K 16/02 310/114 |

OTHER PUBLICATIONS

International Search Report and Written Opinion, PCT/US2011/030119, Rolls-Royce North American Technologies Inc., Nov. 17, 2011.

European Patent Office, Written Opinion issued Aug. 23, 2016 for Application No. 11798531.7 filed Oct. 10, 2012, Applicant Rolls Royce North American Technologies, Inc. (5 pages).

* cited by examiner

ADAPTIVE FAN SYSTEM FOR A VARIABLE CYCLE TURBOFAN ENGINE

CROSS REFERENCE TO RELATED APPLICATIONS

The present application is a 35 U.S.C. §371 national stage application of International Application No. PCT/US2011/030119, filed Mar. 27, 2011, which claims the benefit of the U.S. Non-Provisional patent application Ser. No. 13/072, 695, filed Mar. 26, 2011, which in turn claims the benefit of U.S. Provisional Patent Application 61/317,978, filed Mar. 26, 2010, all of which are incorporated herein by reference.

GOVERNMENT RIGHTS IN PATENT

The invention described herein was made with the proceeds from U.S. government contract No. FA8650-07-C-2803, awarded by the U.S. Air Force. The U.S. government may have certain rights in this patent.

FIELD OF THE INVENTION

The present invention relates to gas turbine engines, and more particularly, to an adaptive fan for a variable cycle gas turbine engine.

BACKGROUND

Gas turbine engines, and gas turbine engine cycles and bypass ratios remain an area of interest. Some existing systems have various shortcomings, drawbacks, and disadvantages relative to certain applications. Accordingly, there remains a need for further contributions in this area of technology.

SUMMARY

One embodiment of the present invention is a unique gas turbine engine. Another embodiment is a unique variable cycle gas turbine engine. Another embodiment is a unique adaptive fan system for a variable cycle turbofan engine having at least one turbine. Another embodiment is a unique method for operating a variable cycle gas turbine engine. Other embodiments include apparatuses, systems, devices, hardware, methods, and combinations for gas turbine engines and related systems. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

The gas turbine industry produces aircraft gas turbine engines for both commercial and military air vehicle propulsion. For large commercial platforms, high bypass ratio (BPR) fan engines are typically employed. High BPR fan engines enjoy a relatively high efficiency, as manifested by a low specific fuel consumption. Military platforms, on the other hand, typically employ engines having a high power to weight ratio, which are high thrust, low BPR engines, e.g., for interceptor, fighter and fighter/bomber platforms. Although military aircraft gas turbine engines may exhibit a high thrust to weight ratio, e.g., relative to commercial transport aircraft engines, such engines typically do not achieve the efficiency levels seen in commercial aircraft engines. Rather, such military aircraft gas turbine engines have a higher specific fuel consumption. In order to provide military air vehicles with longer range capability, including under supercruise operating conditions (that is, supersonic flight without the use of thrust augmentation devices, such as afterburners), as well as to provide the high thrust levels preferable for short take off and aggressive maneuvering, it is desirable to have a variable cycle gas turbine engine. In particular, it is desirable to have a gas turbine engine that may achieve the lower specific fuel consumption typically associated with high BPR engines, and which may also achieve the high thrust and high power-to-weight ratio typically associated with low BPR engines.

Figure 1:
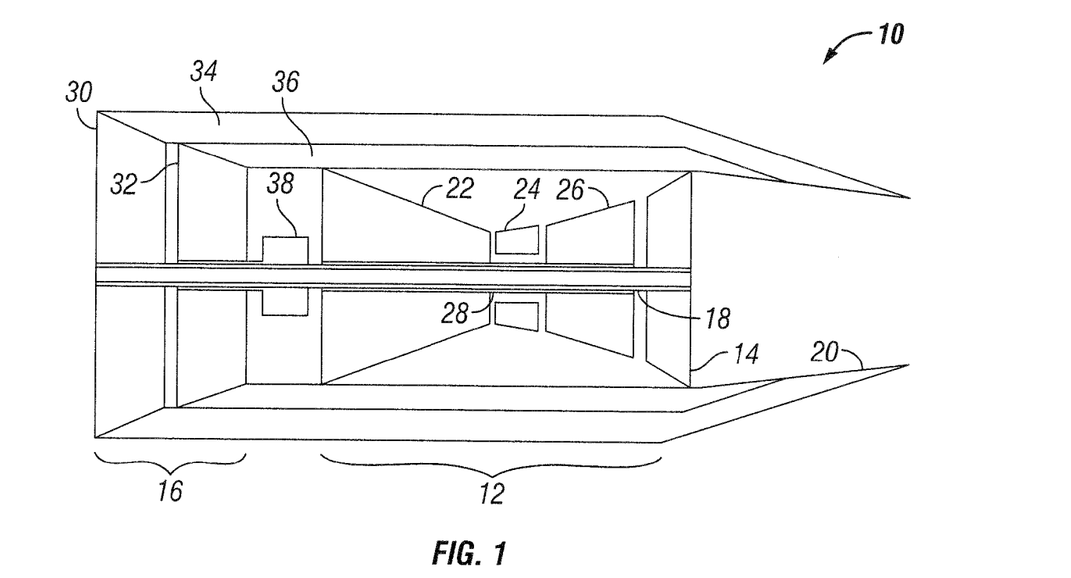
FIG. 1 schematically depicts some aspects of a non-limiting example of a variable cycle aircraft gas turbine engine in accordance with an embodiment of the present invention.

Referring now to the drawings, and in particular, FIG. 1, a gas turbine engine 10 in accordance with an embodiment of the present invention it is depicted. In one form, gas turbine engine 10 is a variable cycle engine. In other embodiments, gas turbine engine 10 may not be a variable cycle engine. In one form, variable cycle gas turbine engine 10 is an aircraft engine, and in particular, a turbofan engine. However, it will be understood that in other embodiments, engine 10 may be in the form of another type of gas turbine engine, such as a turboprop engine, a turbojet engine, or a turboshaft engine, and may be configured for one or more of various purposes, e.g., aircraft propulsion, ship propulsion, land vehicle propulsion, or power generation. In still other embodiments, engine 10 may be a combined cycle engine. In some embodiments, engine 10 may be part of a gas turbine engine system that powers other machinery, e.g., generators, pumps, compressors and the like, using engine 10.

Variable cycle gas turbine engine 10 includes a gas generator 12, a low pressure (LP) turbine 14, an adaptive fan 16, an LP shaft 18 and an exhaust system 20, such as a variable exhaust system having one or more variable nozzles. Adaptive fan 16 is powered by LP turbine 14 via LP shaft 18.

Gas generator 12 includes a compressor 22, a combustor 24, a high pressure (HP) turbine 26 and an HP shaft 28. Compressor 22 includes a plurality of compressor stages (not shown), and is coupled to HP turbine 26 via HP shaft 28 in a driving arrangement. Compressor 22 is structured to pressurize the airflow received at its inlet from adaptive fan 16. Some of the compressor discharge air and/or interstage air pressurized by compressor 22 may be supplied to other engine 10 components, e.g., turbine wheels, blades and vanes, for cooling. In addition, some of the compressor discharge air and/or interstage air pressurized by compressor 22 may be provided in the form of customer bleed air, e.g., for use by the aircraft environmental control systems, as well as for use in active lift surfaces and control surfaces of the aircraft, e.g., to maintain desirable airflow characteristics of such surfaces under varying flight conditions.

Combustor 24 is in fluid communication with compressor 22, and is structured to combust a mixture of fuel and the compressor discharge air received from compressor 22. Engine core flowpath gases exiting HP turbine 26 are directed into LP turbine 14, which extracts mechanical power from the hot working airflow, and which provides power to drive adaptive fan 16. LP shaft 18 is coupled to LP turbine 14, and is configured to receive and transmit the mechanical power to adaptive fan 16.

Adaptive fan 16 includes a base fan 30 and a variable-speed fan 32, both of which are powered by LP turbine 14 via LP shaft 18. It will be noted that in other embodiments of the present invention, depending on the configuration and/or installation of engine 10, another base rotating load other than base fan stage 30 may be employed, and another variable-speed rotating load other than variable-speed fan stage 32 may be employed. Examples of other base rotating loads include, but are not limited to, generators, pumps, gearboxes and compressors, the latter including engine 10 compressors and/or engine 10 driven equipment. Examples of other variable-speed rotating loads include, but are not limited to, generators, pumps, gearboxes, one or more boost compressors, and/or may be one or more stages of a core compressor, e.g., powered by HP shaft 28 and/or another turbine via a transmission system, such as that described herein, which is structured to vary the speed of the variable-speed rotating load.

In one form, base fan 30 includes a single rotating fan stage in the present embodiment. In other embodiments, base fan 30 may include more than one fan stage. In one form, variable-speed fan 32 includes one rotating fan stage. In other embodiments, variable-speed fan 32 may include more than one fan stage.

It will be understood that the term, "variable-speed," as applied to variable-speed fan 32, does not imply that the base rotating load, which in the present embodiment base fan 30, is limited to rotation at a single speed. Rather, the term, "variable-speed" is meant to indicate that the variable-speed load, which in the present embodiment is variable-speed fan 32, has a speed that is variable, in particular, variable relative to the speed of the base rotating load, by virtue of the aspects of embodiments of the present invention.

A portion of the airflow exiting base fan 30 is directed into a bypass duct 34 for directly providing thrust via exhaust system 20, and the balance is directed to variable-speed fan 32. A portion of the airflow exiting variable-speed fan 32 is directed into a bypass duct 36 for directly providing thrust via exhaust system 20, and the balance is directed into compressor 22 as core airflow, which provides thrust via exhaust system 20 after exiting LP turbine 14.

Although adaptive fan 16 is powered by LP turbine 14 via LP shaft 18, as previously mentioned. In one form, base fan 30 is coupled directly to LP shaft 18 and driven thereby, whereas variable-speed fan 32 is coupled to LP shaft 18 via an intervening transmission system 38, and hence is powered indirectly by LP shaft 18 via transmission system 38. In the present embodiment, transmission system 38 is structured to selectively vary the speed of variable-speed fan 32, e.g., relative to the speed of base fan 30.

Figure 2:
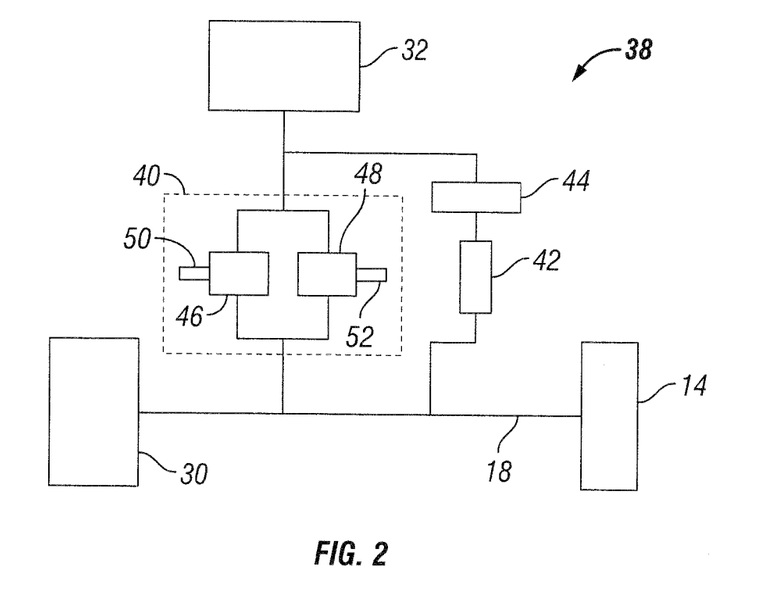
FIG. 2 schematically depicts some aspects of a non-limiting example of a transmission system structured to vary a speed of a rotating load, such as a fan in a turbofan engine, in accordance with an embodiment of the present invention.

Referring now to FIG. 2, a non-limiting example of an embodiment of transmission system 38 is described. In one form, transmission system 38 includes a clutch mechanism 40, a geartrain 42 and an overrunning clutch 44, such as a sprag (Sprague) clutch. In other embodiments, a friction clutch and a positive locking mechanism, or other types of clutch devices may be employed in place of overrunning clutch 44. Each of clutch mechanism 40 and geartrain 42 is coupled to LP shaft 18. Geartrain 42 and overrunning clutch 44 form a load path extending from LP shaft 18 to variable-speed fan 32 that is parallel to the load path through clutch mechanism 40.

Clutch mechanism 40 is structured to selectively couple variable-speed fan 32 to LP shaft 18, and includes a friction clutch 46 and a positive locking mechanism 48 arranged in parallel to each other. In one form, friction clutch 46 is a dry clutch, although it is contemplated that in other embodiments, a wet clutch may be employed. Similarly, an overrunning clutch may be employed in place of friction clutch 46 and positive locking mechanism 48 in other embodiments.

Friction clutch 46 is actuated by a clutch actuator 50, and positive locking mechanism 48 is actuated by a lock actuator 52. In the present embodiment, clutch actuator 50 and lock actuator 52 are hydraulically operated by oil pressure from a lube system (not shown) of engine 10. Friction clutch 46 is coupled in parallel to positive locking mechanism 48. When actuated to engage, friction clutch 46 provides a load path parallel to positive locking mechanism 48, thus deloading positive locking mechanism 48 and allowing selective engagement or disengagement of positive locking mechanism 48 via lock actuator 52. In one form, positive locking mechanism 48 is a spline coupling that is axially engaged or disengaged via translation of lock actuator 52. It is alternatively contemplated that other types of positive locking mechanisms may be employed in other embodiments, e.g., a curvic coupling or a toothed clutch.

During operation, transmission system 38 may vary the speed of variable-speed fan 32 by selecting a load path through clutch mechanism 40 or a load path through geartrain 42 and overrunning clutch 44. For example, with positive locking mechanism 48 engaged, variable-speed fan 32 is driven by LP shaft 18 at the same speed as base fan 30. Overrunning clutch 44 is structured to operate in the overrunning mode when variable-speed fan 32 is at a speed greater than the rotational speed delivered by geartrain 42. In one form, geartrain 42 provides a 60% speed reduction relative to the input rotational speed given by the rotational speed of LP shaft 18. In other embodiments, other gear ratios may be employed to reduce or increase the rotational velocity output by geartrain 42. In any event, overrunning clutch 44 is coupled between variable-speed fan 32 and geartrain 42. Overrunning clutch 44 is structured to transmit power to drive variable-speed fan 32 after the speed of variable-speed fan 32 decays to match the input speed of overrunning clutch 44, as provided by geartrain 42. In one form, the input speed of the overrunning clutch is less than the speed of the shaft.

During engine 10 operations with locking mechanism 48 engaged, overrunning clutch 44 is operated in the overrunning mode, and hence, power is delivered from LP shaft 18 through positive locking mechanism 48, driving variable-speed fan 32 at the same speed as base fan 30. In order to change the speed of variable-speed fan 32, clutch mechanism 40 is engaged under the action of clutch actuator 50 in order to deload positive locking mechanism 48, thereby allowing positive locking mechanism 48 to be selectively disengaged. Lock actuator 52 is then operated to disengage positive locking mechanism 48, after which the power for driving variable-speed fan 32 is delivered via the load path through clutch mechanism 40. Clutch mechanism 40 is then disengaged, which allows variable-speed fan 32 to slow down by virtue of aerodynamic loading. While slowing down, overrunning clutch 44 continues to operate in the overrunning mode. When variable-speed fan 32 reaches the output speed of geartrain 42, overrunning clutch 44 engages and picks up the load, at which point power is delivered from LP shaft 18 to variable-speed fan 32 through geartrain 42 and overrunning clutch 44.

In order to upshift transmission system 38, i.e., so that variable-speed fan 32 accelerates to operate at the same speed as base fan 30, clutch mechanism 40 is engaged under the action of clutch actuator 50 in order to bring variable-speed fan 32 up to speed, and then lock actuator 52 is employed to engage positive locking mechanism 48. Clutch mechanism 40 is then disengaged, after which the power for driving variable-speed fan 32 is delivered via the load path through positive locking mechanism 48.

In view of the above description, it will be apparent to those skilled in the art that the adaptive fan feature of the present invention may allow a gas turbine engine to have a variable cycle, and to function in a high thrust low bypass ratio mode, e.g., by operating variable-speed fan stage 32 at the same speed as base fan 30 speed, or operate at higher efficiency in a higher bypass ratio mode, e.g., by operating variable-speed fan 32 at a lower speed. In addition, rather than varying the engine thrust by reducing the total flow through the engine (and hence through the air-vehicle's inlet to the engine, thus resulting in a mismatch between the engine flow demand and the design operating point of the inlet (lowest loss condition), and whereby the engine is forced to operate over a wide range of engine spool speeds, gas flows and pressures); engine thrust can be varied by varying the amount of flow diverted to the third stream, e.g., bypass duct 36, while the total inlet flow to engine 10 may be maintained nearly constant over a wide range of engine power/thrust output. The remainder of the engine may thus operate over a more narrow and hence more optimized range of spool speeds, gas flows, and pressures, which may improve efficiency and may also improve the transient characteristics of the engine, because spool speed changes are reduced.

Accordingly, in some embodiments of the present invention, one fan stage may be directly coupled to a turbine, e.g., a low pressure turbine, via a conventional shaft. Another fan stage may be driven through a transmission system that allows selectable speeds. The second stage fan may be driven at the same speed as a first stage fan, or a different, e.g., reduced speed for the second stage fan relative to the first stage fan rotor may be selected.

In one form, the speed reduction of one or more fan stages is accomplished by inserting a geartrain between the low pressure drive turbine and the fan stage(s) for which variable speed is desired. The geartrain may be a lay-shaft design, for example containing three lay-shafts. In other embodiments, other geartrain systems, such as bevel gear designs, may be employed. In some embodiments, the geartrain may preferably provide a 40% reduction in speed, although in other embodiments other reductions may be employed, for example and without limitation, a reduction in speed in the range 15-50%. In still other embodiments, other speed reductions and/or increases in output speed may be employed.

Figure 3:
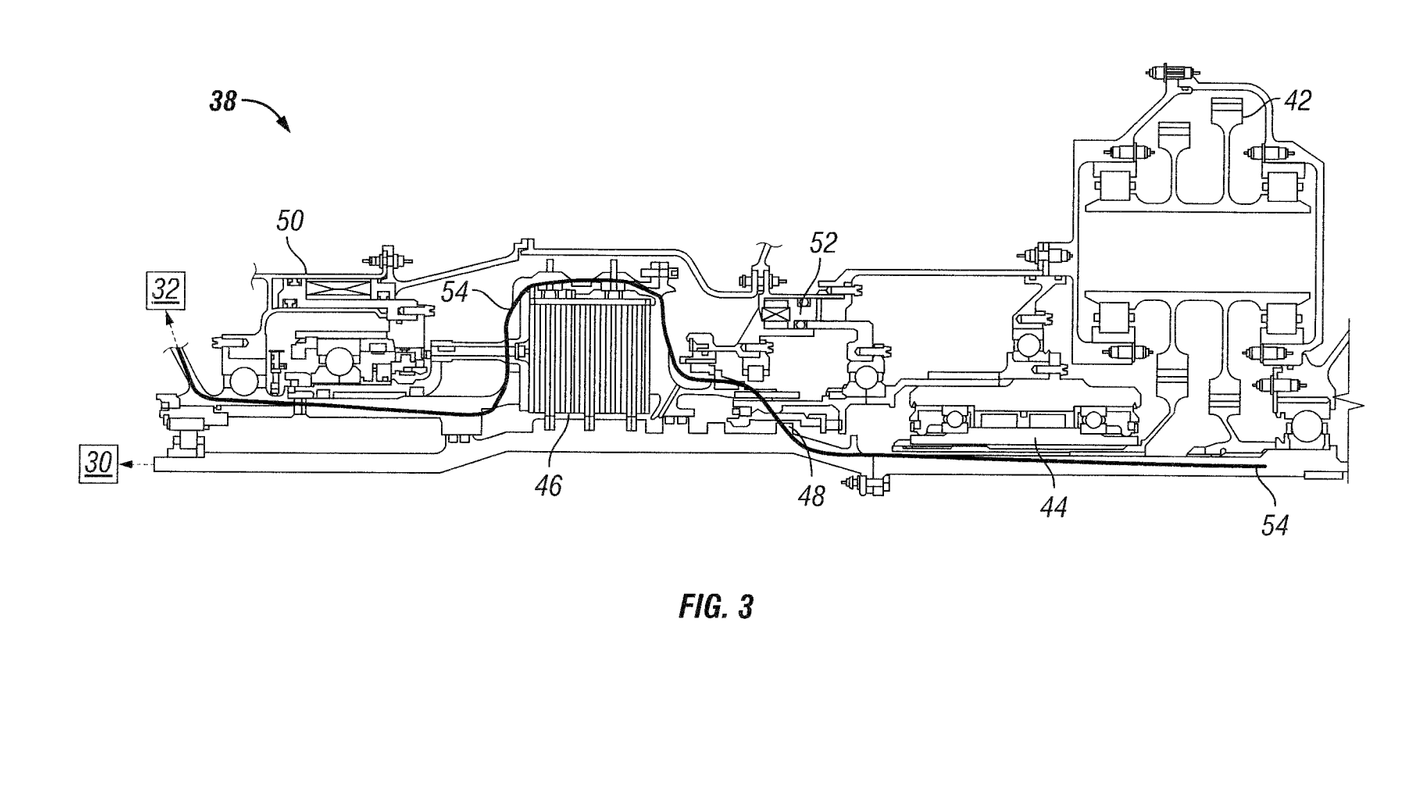
FIG. 3 depicts some aspects of a non-limiting example of a load path for driving a variable-speed fan in accordance with the embodiment of FIG. 2.

Referring now to FIG. 3, a non-limiting example of a load path 54 for driving the variable-speed fan 32 at the same speed as base fan 30 is depicted. In the depiction of FIG. 3, load path 54 is illustrated as a thick, dark line. As illustrated in FIG. 3, positive locking mechanism 48 takes the form of a translating splined lock that couples LP shaft 18 to variable-speed fan 32 through auxiliary shafting, such as the illustrated forward and aft clutch housings and cone shaft. Lock actuator 52 may be employed to engage and disengage the splined lock.

Figure 4:
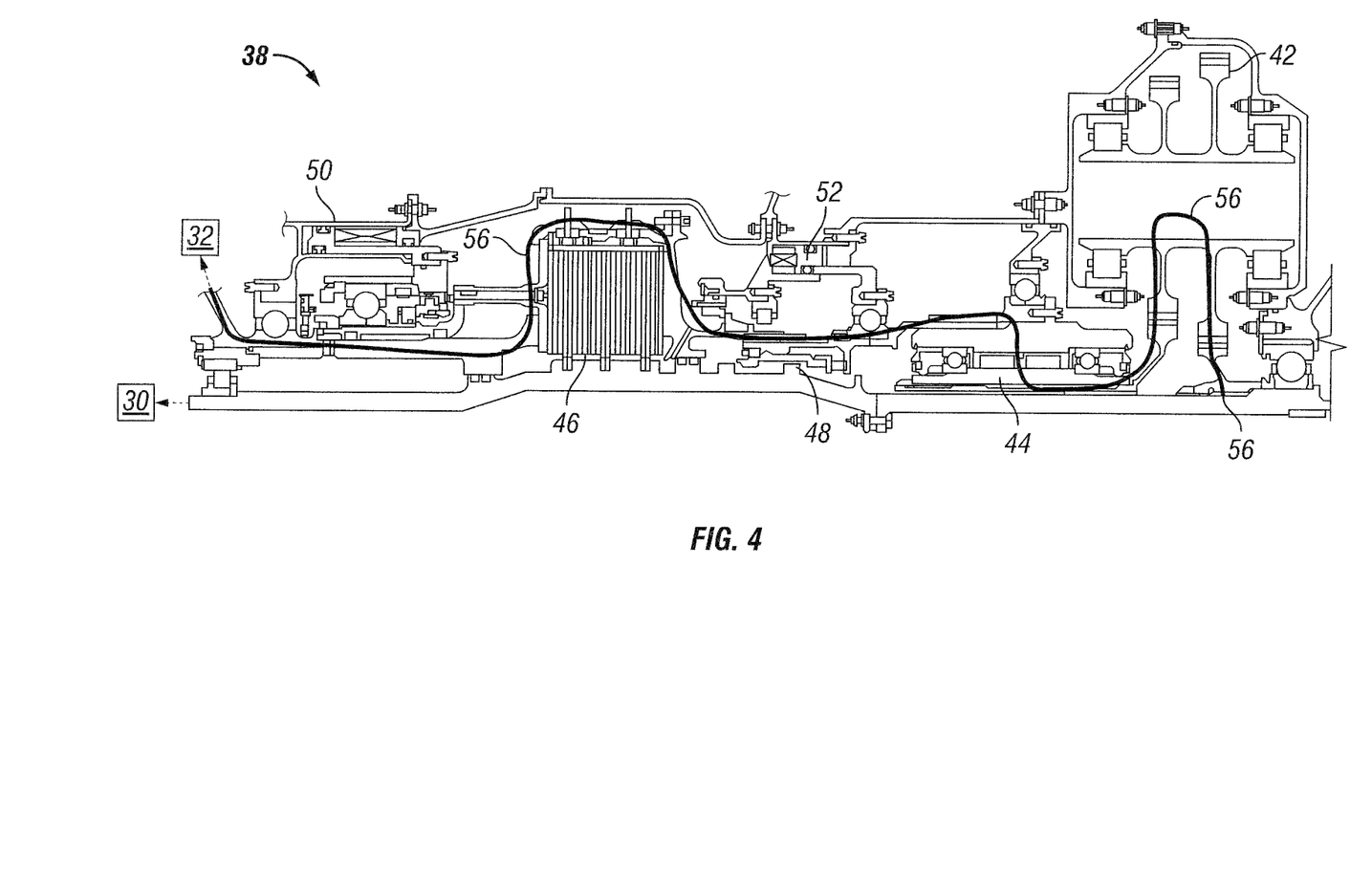
FIG. 4 depicts some aspects of a non-limiting example of a load path for driving a variable-speed fan at a reduced speed in accordance with the embodiment of FIG. 2.

Referring now to FIG. 4, a non-limiting example of a load path 56 for driving variable-speed fan 32 at a reduced speed is illustrated. In the depiction of FIG. 4, load path 54 is illustrated as a thick, dark line. In the operating mode depicted in FIG. 4, torque is transmitted through the gearbox, i.e., geartrain 42, through overrunning clutch 44, and into the same auxiliary shafting described above with respect to FIG. 3 to drive variable-speed fan 32. Although overrunning clutch 44 takes the form of a Sprague clutch in the present embodiment, in other embodiments, other clutching mechanisms may be employed. For example, in some embodiments, a friction clutch and lock mechanism would provide similar functionality. The friction clutch could be of the wet or dry type. An advantage of the Sprague clutch over a friction clutch is improved packaging, less heat rejection to the oil, and reduced maintenance.

In the high thrust mode, variable-speed fan 32 runs at the same speed as base fan 30. To change from this mode to the cruise mode, variable-speed fan 32 is slowed to 60% of the speed of base fan 30. In order to accomplish this transition, variable-speed fan 32 is disengaged by first engaging a clutch pack, e.g., friction clutch 46, located between LP shaft 18 and variable-speed fan 32. The engagement of friction clutch 46 provides a load path parallel to positive locking mechanism 48, thus taking the load off positive locking mechanism 48 and allowing positive locking mechanism 48 to be disengaged. Friction clutch 46 is then released, allowing variable-speed fan 32 to spool down. In the present embodiment, the Sprague clutch, e.g., overrunning clutch 44, engages when variable-speed fan 32 is at 60% of base fan 30 design speed, at which point overrunning clutch 44 picks up variable-speed fan 32 and couples it with the gear box, e.g., geartrain 42. The fan system, i.e., adaptive fan 16, is now in the cruise or SFC mode. Although the present embodiment employs a dry clutch as friction clutch 46, in other embodiments a wet clutch may be employed. An advantage of a dry clutch over a wet clutch may be improved packaging, less heat rejection to the oil in the engine's lube system, and reduced maintenance.

To transition from the cruise mode back to the high thrust mode, friction clutch 46 is engaged, which causes variable-speed fan 32 to accelerate. Overrunning clutch 44 immediately over-runs, disengaging variable-speed fan 32 from geartrain 42. Friction clutch 46 slips until variable-speed fan 32 is brought up to the same speed as base fan 30. When the two fans are synchronous, the translating lock mechanism, i.e., positive locking mechanism 48, is engaged, and friction clutch 46 is released. This completes the transition to high thrust mode.

In one form, because the flow capacity of the variable-speed fan 32 varies considerably between the cruise mode and the high thrust mode, a third stream off take is employed to accommodate the excess flow, e.g., bypass duct 36. In other embodiments, a third stream off take may not be employed. In still other embodiments, more than one off take stream may be employed to accommodate the excess flow.

Embodiments of the present invention include a gas turbine engine having a transmission system coupled to one of the turbines via a shaft. One rotating load may be coupled directly to the shaft, and another rotating load may be coupled to the shaft via the transmission system. The transmission system may provide a second load path for driving the rotating load at a speed different than the rotating speed of the shaft. The transmission may be structured to selectively vary it's output speed relative to the input speed defined by the shaft's speed.

In some embodiments, the rotating loads may be fan stages of a turbofan engine. For example, one of the fan stages may be operated at the same speed as the shaft, which may be referred to as a base fan or base fan stage. Another fan stage may be selectively operated at different speeds via the transmission system (which is coupled to the shaft), and hence may be referred to as a variable-speed fan or variable-speed fan stage. Of course, multiple fan stages may be employed for the base fan and/or for the variable-speed fan.

By virtue of providing a variable-speed fan, the turbofan engine may be a variable cycle gas turbine engine. For example, separate bypass ducts may be employed for the base fan and variable-speed fan. By selectively varying the speed of the variable-speed fan and the flow-split between the engine core and the variable-speed fan's bypass duct, the engine's operating cycle and bypass ratio may be varied.

However, the present invention is not limited to a turbofan engine. For example, using the concepts described herein, one or more stages of a core compressor and/or boost compressor may be coupled via a transmission system, which may be employed to vary the cycle of many different types of gas turbine engines.

Embodiments of the present invention include a gas turbine engine, comprising; a compressor structured to compress an airflow received at the compressor and to output the compressed airflow as a compressor discharge airflow; a combustor in fluid communication with the compressor, the combustor being structured to combust a mixture of a fuel and at least some of the compressor discharge airflow to generate a hot working airflow; a turbine in fluid communication with the combustor, the turbine being configured to extract a mechanical power from the hot working airflow; a shaft coupled to the turbine, the shaft being configured to receive and transmit the mechanical power from the turbine; a first rotating load powered by the shaft; a second rotating load powered by the shaft; and a transmission system coupled to the shaft, the transmission system being structured to selectively vary a speed of the second rotating load relative to a speed of at least one of the shaft and the first rotating load.

In a refinement, the gas turbine engine is configured as a turbofan engine, wherein the first rotating load is a fan stage.

In another refinement, the gas turbine engine is configured as a variable cycle turbofan engine, wherein the second rotating load is an other fan stage.

In yet another refinement, the gas turbine engine further comprises: a first bypass duct configured to bypass at least a portion of the output of the fan stage to provide a thrust component; and a second bypass duct configured to bypass at least a portion of the output of the other fan stage to provide an other thrust component, wherein the turbine is configured to output a third thrust component.

In still another refinement, the first rotating load is coupled directly to the shaft, wherein the second rotating load is coupled to the shaft via the transmission system.

In yet still another refinement, the transmission system includes: a geartrain coupled to the shaft; and a clutching mechanism coupled to the shaft, wherein said clutching mechanism is structured to selectively couple said second rotating load to one of directly to said shaft and to said shaft through said geartrain.

In a further refinement, the clutching mechanism includes a friction clutch and a positive locking mechanism coupled in parallel to the friction clutch.

In a yet further refinement, the transmission system further includes an overrunning clutch coupled between the second rotating load and the shaft, wherein the transmission is structured to transmit power to drive the second rotating load upon the speed of the second rotating load decaying to a predetermined speed relative to the speed of the shaft.

In a still further refinement, the gas turbine engine further comprises means coupled to the shaft for driving the second rotating load to at a speed different from the speed of the shaft.

Embodiments of the present invention include a gas turbine engine system, comprising: a compressor structured to compress an airflow received at the compressor and to output the compressed airflow as a compressor discharge airflow; a combustor in fluid communication with the compressor, the combustor being structured to combust a mixture of a fuel and at least some of the compressor discharge airflow to generate a hot working airflow; a turbine in fluid communication with the combustor, the turbine being configured to extract a mechanical power from the hot working airflow; a base rotating load; a variable-speed rotating load; transmission means for transmitting power from the turbine to at least one of the base rotating load and the variable-speed rotating load; and means for varying a speed of the variable-speed rotating load relative to the speed of the base rotating load.

In a refinement, the base rotating load is a fan stage.

In another refinement, the variable-speed rotating load is an other fan stage.

In yet another refinement, the base rotating load is a variable-speed load.

In still another refinement, the gas turbine engine system further comprises a shaft coupling the base rotating load to the turbine, wherein the shaft is operative to rotate the base rotating load at the same speed as the turbine.

In yet still another refinement, the transmission means is operative to selectively rotate the variable-speed rotating load at the same speed as the turbine and to rotate the variable-speed rotating load at a different speed than the turbine.

In a further refinement, the transmission means includes a friction clutch and a geartrain; wherein the friction clutch is operative to selectively couple the variable-speed rotating load directly to the shaft and to couple the variable-speed rotating load to the shaft via the geartrain.

Embodiments of the present invention include an adaptive fan system for a variable cycle turbofan engine having at least one turbine, comprising: a shaft structured to receive mechanical power from a turbine in the variable cycle turbofan engine; a fan stage coupled directly to the shaft and driven directly by the shaft; a transmission system coupled to the shaft; an other fan stage coupled to the shaft via the transmission system and driven by the shaft via the transmission system, wherein the transmission system is structured to selectively vary a speed of the other fan stage relative to at least one of the shaft and the fan stage.

Embodiments of the present invention include a method for operating a variable cycle gas turbine engine, comprising: extracting power from a turbine via a shaft to drive a first fan stage; extracting power from the turbine via the shaft to drive a second fan stage different from the first fan stage; and varying a speed of the second fan stage relative to the first fan stage.

In a refinement, the method further includes controlling the speed of the second fan stage to maintain a corrected airflow through the variable cycle gas turbine engine.

In another refinement, wherein the variable cycle gas turbine engine has a core engine flow, a main bypass flow and a third airflow stream defining a second bypass flow, the method further comprises varying the second bypass flow by controlling the speed of the second fan stage.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. It will be also understood that the use of such terms as "first," "second" and the like do not imply an ordering of components or features unless specifically so delineated herein. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A gas turbine engine, comprising;
   a compressor structured to compress an airflow received at the compressor and to output the compressed airflow as a compressor discharge airflow;
   a combustor in fluid communication with said compressor, said combustor being structured to combust a mixture of a fuel and at least some of said compressor discharge airflow to generate a hot working airflow;
   a turbine in fluid communication with said combustor, said turbine being configured to extract a mechanical power from said hot working airflow;
   a shaft coupled to said turbine, said shaft being configured to receive and transmit said mechanical power from said turbine;
   a first rotating load powered by said shaft;
   a second rotating load powered by said shaft, wherein the first rotating load and the second rotating load rotate in the same direction; and
   a transmission system including:
      a geartrain coupled to said shaft;
      a clutching mechanism coupled to said shaft in parallel to said geartrain,
   wherein said clutching mechanism includes a clutch and a positive locking mechanism disposed axially aft in relation to the clutch, wherein the second rotating load is disposed forward of the clutch, wherein the clutch couples the shaft to the second rotating load through alternating engagement of one of the positive locking mechanism and the geartrain such that when the positive locking mechanism is engaged the second rotating load is driven by the shaft at a same speed as the first rotating load and when the geartrain is engaged the second rotating load is driven at a speed less than the speed of the first rotating load, said transmission system being structured to selectively vary a speed at which power is supplied from said shaft to said second rotating load relative to a speed of at least one of said shaft and said first rotating load, wherein to increase extraction of mechanical power the second rotating load rotates at a same speed as the first rotating load.

2. The gas turbine engine of claim 1, configured as a turbofan engine, wherein said first rotating load is a fan stage.

3. The gas turbine engine of claim 2, configured as a variable cycle turbofan engine, wherein said second rotating load is an other fan stage.

4. The gas turbine engine of claim 3, further comprising:
   a first bypass duct configured to bypass at least a portion of the output of said fan stage to provide a thrust component; and
   a second bypass duct configured to bypass at least a portion of the output of said other fan stage to provide an other thrust component,
   wherein said turbine is configured to output a third thrust component.

5. The gas turbine engine of claim 1, wherein said first rotating load is coupled directly to said shaft, and wherein said second rotating load is coupled to said shaft via said transmission system.

6. The gas turbine engine of claim 5, wherein the transmission system coupled to said shaft is configured to drive said second rotating load at a speed different from the speed of said shaft.

7. The gas turbine engine of claim 1, wherein said clutch is a friction clutch.

8. The gas turbine engine of claim 1, said transmission system further including an overrunning clutch coupled between said second rotating load and said shaft, wherein said transmission system is structured to transmit power to drive said second rotating load upon the speed of said second rotating load decaying to a predetermined speed relative to the speed of said shaft.

9. A gas turbine engine system, comprising:
   a compressor structured to compress an airflow received at the compressor and to output the compressed airflow as a compressor discharge airflow;
   a combustor in fluid communication with said compressor, said combustor being structured to combust a mixture of a fuel and at least some of said compressor discharge airflow to generate a hot working airflow;
   a turbine in fluid communication with said combustor, said turbine being configured to extract a mechanical power from said hot working airflow;
   a base rotating load;
   a variable-speed rotating load; and a transmission system configured to transmit power from said turbine to at least one of said base rotating load and said variable-speed rotating load via a shaft, the transmission system including:
a geartrain coupled to said shaft;
a clutching mechanism coupled to said shaft in parallel to said geartrain,
wherein said clutching mechanism includes a clutch and a positive locking mechanism disposed axially aft in relation to the clutch, wherein the variable-speed rotating load is disposed forward of the clutch, wherein the clutch couples the shaft to the variable-speed rotating load through alternating engagement of one of the positive locking mechanism and the geartrain such that when the positive locking mechanism is engaged the variable-speed rotating load is driven by the shaft at a same speed as the base rotating load and when the geartrain is engaged the variable-speed rotating load is driven at a speed less than the speed of the base rotating load,
wherein the transmission system is structured to selectively vary a speed at which power is supplied from said turbine to said variable-speed rotating load relative to a speed of said base rotating load, wherein to increase extraction of mechanical power the variable-speed rotating load rotates at a same speed and in a same direction as the base rotating load.

10. The gas turbine engine system of claim 9, wherein said base rotating load is a fan stage.

11. The gas turbine engine system of claim 10, wherein said variable-speed rotating load is an other fan stage.

12. The gas turbine engine system of claim 10, wherein said base rotating load is a variable-speed load.

13. The gas turbine engine system of claim 9, wherein said shaft is operative to rotate said base rotating load at the same speed as said turbine.

14. The gas turbine engine system of claim 13, wherein said transmission system is operative to selectively rotate said variable-speed rotating load at the same speed as said turbine or to rotate said variable-speed rotating load at a different speed than said turbine.

15. The gas turbine engine system of claim 13, wherein said clutch is a friction clutch, and wherein said friction clutch is operative to selectively couple said variable-speed rotating load directly to said shaft or to couple said variable-speed rotating load to said shaft via said geartrain.

16. An adaptive fan system for a variable cycle turbofan engine having at least one turbine, comprising:
a shaft structured to receive mechanical power from a turbine in said variable cycle turbofan engine;
a fan stage coupled directly to said shaft and driven directly by said shaft;
a transmission system coupled to said shaft;
an other fan stage coupled to said shaft via said transmission system and driven by said shaft via said transmission system, the transmission system including:
a geartrain coupled to said shaft;
a clutching mechanism coupled to said shaft in parallel to said geartrain,
wherein said clutching mechanism includes a clutch and a positive locking mechanism disposed axially aft in relation to the clutch, wherein the other fan stage is disposed forward of the clutch, wherein the clutch couples the shaft to the other fan stage through alternating engagement of one of the positive locking mechanism and the geartrain such that when the positive locking mechanism is engaged the other fan stage is driven by the shaft at a same speed as the fan stage and when the geartrain is engaged the other fan stage is driven at a speed less than the speed of the fan stage,
wherein said transmission system is structured to selectively vary a speed at which power is supplied from said shaft to said other fan stage relative to at least one of said shaft and said fan stage, wherein the fan stage and the other fan stage are configured to rotate in a same direction and at a same speed to increase the mechanical power of the turbine.

17. A method for operating a variable cycle gas turbine engine, comprising:
extracting power from a turbine via a shaft to drive a first fan stage;
extracting power from said turbine via said shaft to drive a second fan stage different from the first fan stage;
providing a transmission system including:
a geartrain coupled to said shaft;
a clutching mechanism coupled to said shaft in parallel to said geartrain,
wherein said clutching mechanism includes a clutch and a positive locking mechanism disposed axially aft in relation to the clutch, wherein the second fan stage is disposed forward of the clutch, wherein the clutch couples the shaft to the second fan stage through alternating engagement of one of the positive locking mechanism and the geartrain such that when the positive locking mechanism is engaged the second fan stage is driven by the shaft at a same speed as the first fan stage and when the geartrain is engaged the second fan stage is driven at a speed less than the speed of the first fan stage;
varying a speed at which power is supplied from said turbine to said second fan stage via the transmission system; and
rotating the second fan stage in a same direction and at a same speed as the first fan stage to increase the power of the turbine.

18. The method of claim 17, further comprising controlling the speed of said second fan stage to maintain a corrected airflow through said variable cycle gas turbine engine.

19. The method of claim 17, wherein said variable cycle gas turbine engine has a core engine flow, a main bypass flow and a third airflow stream defining a second bypass flow, further comprising varying said second bypass flow by controlling the speed of said second fan stage.

* * * * *